United States Patent
Tanimoto et al.

(10) Patent No.: US 9,613,051 B2
(45) Date of Patent: Apr. 4, 2017

(54) DATA PROCESSING METHOD, INFORMATION PROCESSING APPARATUS, AND RECORDING MEDIUM

(71) Applicant: FUJITSU LIMITED, Kawasaki-shi, Kanagawa (JP)

(72) Inventors: Kazuhisa Tanimoto, Nishinomiya (JP); Hideaki Tanaka, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 295 days.

(21) Appl. No.: 14/221,336

(22) Filed: Mar. 21, 2014

(65) Prior Publication Data
US 2014/0297698 A1 Oct. 2, 2014

(30) Foreign Application Priority Data
Mar. 29, 2013 (JP) ................. 2013-074442

(51) Int. Cl.
G06F 7/00 (2006.01)
G06F 17/30 (2006.01)

(52) U.S. Cl.
CPC ............. G06F 17/30227 (2013.01)

(58) Field of Classification Search
CPC ......... G06F 17/3028; G06K 9/00288
USPC ........................................ 707/826
See application file for complete search history.

(56) References Cited

U.S. PATENT DOCUMENTS

| | | | | |
|---|---|---|---|---|
| 5,857,205 A * | 1/1999 | Roth | ........... | G06F 11/0751 |
| 2005/0235133 A1 | 10/2005 | Terai et al. | | |
| 2006/0048155 A1* | 3/2006 | Wu | ........... | G06F 9/4843 |
| | | | | 8/101 |
| 2006/0156313 A1* | 7/2006 | Hambrick | ........... | G06F 8/20 |
| | | | | 719/315 |
| 2007/0162604 A1* | 7/2007 | Murakami | ........... | G06Q 40/00 |
| | | | | 709/226 |
| 2008/0127186 A1* | 5/2008 | Kanodia | ........... | G05B 23/0216 |
| | | | | 718/101 |
| 2008/0251430 A1* | 10/2008 | Girnus | ........... | B07C 3/00 |
| | | | | 209/584 |
| 2009/0146776 A1* | 6/2009 | Iwahashi | ........... | G06K 19/0719 |
| | | | | 340/5.1 |
| 2009/0218262 A1* | 9/2009 | Bowers | ........... | B07C 3/00 |
| | | | | 209/584 |
| 2010/0038422 A1* | 2/2010 | Cardullo | ........... | G06F 9/5061 |
| | | | | 235/385 |

(Continued)

FOREIGN PATENT DOCUMENTS

| JP | 2005-301644 | 10/2005 |
|---|---|---|
| JP | 2009-169793 | 7/2009 |
| JP | 2011-082807 | 4/2011 |

OTHER PUBLICATIONS

Japanese Office Action dated Oct. 4, 2016 in corresponding Japanese Patent Application No. 2013-074442.

*Primary Examiner* — Binh V Ho
(74) *Attorney, Agent, or Firm* — Staas & Halsey LLP

(57) ABSTRACT

An data processing method includes: determining, from execution-target data, a plurality of data items included in the execution-target data, a same series of a plurality of processes being executed for the plurality of data items; associating identification information with each of the plurality of data items; and executing batch processing of the plurality of data items with which the identification information has been associated.

14 Claims, 12 Drawing Sheets

(56) References Cited

U.S. PATENT DOCUMENTS

| | | | |
|---|---|---|---|
| 2010/0254259 A1* | 10/2010 | Singh | G06F 11/1443 370/225 |
| 2011/0296425 A1* | 12/2011 | Fukuda | G06F 9/4881 718/102 |
| 2012/0268785 A1* | 10/2012 | Okada | H04N 1/00244 358/1.15 |
| 2013/0073586 A1* | 3/2013 | Aubry | G06F 17/30477 707/769 |
| 2013/0218943 A1* | 8/2013 | Kawai | H04L 29/08135 709/201 |
| 2014/0229577 A1* | 8/2014 | Bengali | H04L 67/06 709/219 |
| 2014/0376786 A1* | 12/2014 | Johnson | G06K 9/00221 382/118 |

\* cited by examiner

DATA PROCESSING METHOD, INFORMATION PROCESSING APPARATUS, AND RECORDING MEDIUM

CROSS-REFERENCE TO RELATED APPLICATION

This application is based upon and claims the benefit of priority from the prior Japanese Patent Application No. 2013-074442 filed on Mar. 29, 2013, the entire contents of which are incorporated herein by reference.

FIELD

The embodiments discussed herein are related to a data processing method, an information processing apparatus with which the same processing is performed on a plurality of data items, and a recording medium.

BACKGROUND

An enterprise service bus (ESB) is an example of a technology that facilitates the execution of processing in which a variety of services are used. ESBs are provided with a function that converts the data format of messages transferred among services, a function that forwards messages to appropriate destinations (routing), and a service call function and so forth. These functions are referred to as mediation functions. In ESBs, mediation functions corresponding to the messages to be forwarded are executed.

Control of the execution of mediation functions in ESBs is based on real-time control. Thus, in ESBs, messages are processed one at a time. If a plurality of processing-target data items have been input as one group to an ESB, the plurality of processing-target data items are divided into messages for each data item at the entry point of the ESB, for example. The ESB then sequentially executes the mediation functions on the individual messages.

In addition, as related art relating to ESBs, for example, there is a known technology that makes it possible for the most suitable service to be used without taking each service into consideration even when there are a plurality of services having the same processing content. Japanese Laid-open Patent Publication No. 2009-169793 is an example of the related art.

SUMMARY

According to an aspect of the invention, a data processing method includes: determining, from execution-target data, a plurality of data items included in the execution-target data, a same series of a plurality of processes being executed for the plurality of data items; associating identification information with each of the plurality of data items; and executing batch processing of the plurality of data items with which the identification information has been associated.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Conventional ESBs are based on real-time control, and processing efficiency is therefore poor when the same processing is executed on a plurality of data items. For example, in real-time control, processing is executed for each message corresponding to each of a plurality of data items. Thus, processing is started and stopped for each data item even when the same processing is executed on the plurality of data items, and the processing is therefore inefficient.

Herein, a plurality of data items may be formed into one group and batch processed in an ESB. However, when a plurality of data items are formed into one group and processed in one batch, the processing results thereof are also grouped together, and from these processing results it is difficult to identify the processing result for desired data from among the plurality of data items. This problem is not limited to ESBs, and likewise occurs when a plurality of data items are collected and processed in one batch.

In one aspect, the present technology makes it possible to identify, from results obtained by processing a plurality of data items in one batch, the processing result for desired data from among the plurality of data items.

Hereafter, the embodiments are described with reference to the drawings. With regard to the embodiments, it ought to be noted that it is possible for a plurality of embodiments to be combined and implemented as long as they are consistent with one another.

First Embodiment

First, a first embodiment is described. In the first embodiment, identification information is assigned to each of a plurality of data items for which the same processing is to be executed, and thereafter, by processing the plurality of data items in one batch, it becomes possible to identify, from the processing results of the batch processing, the processing result for desired data from among the plurality of data items.

Figure 1:
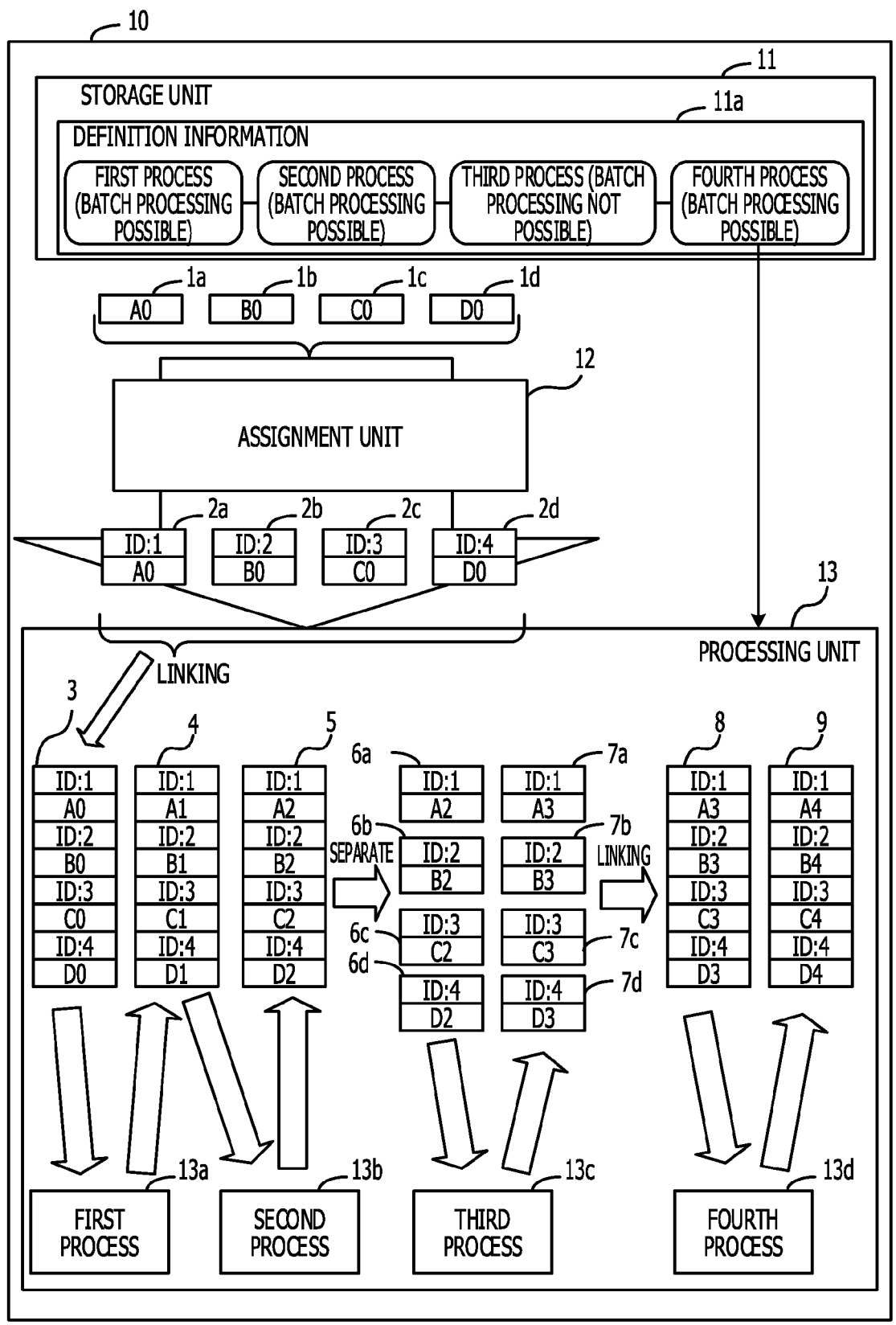
FIG. 1 depicts an example of the functions of an information processing apparatus according to a first embodiment.

FIG. 1 depicts an example of the functions of an information processing apparatus according to the first embodiment. An information processing apparatus 10 has a storage unit 11, an assignment unit 12, and a processing unit 13 in order to, based on definition information, execute processing.

The storage unit 11 stores definition information 11a. The execution procedures for first to fourth processes 13a to 13d, and whether the batch processing of a plurality of data items is possible in the first to fourth processes 13a to 13d are defined in the definition information 11a.

The assignment unit 12 assigns identification information to each of a plurality of data items 1a to 1d for which the same series of a plurality of processes is to be executed. For example, the assignment unit 12 determines a plurality of data items included in one file, as a plurality of data items for which the same series of a plurality of processes is to be executed. The assignment unit 12 then assigns identification information to each of the plurality of data items within the file. The assignment unit 12 transmits, to the processing unit 13, the plurality of data items 2a to 2d to which identification information has been assigned. It ought to be noted that the assignment unit 12 may temporarily store, in the storage unit 11, the plurality of data items 2a to 2d to which identification information has been assigned.

The processing unit 13 performs batch processing of the plurality of data items 2a to 2d to which identification information has been assigned, and based on the identification information, identifies specific data included in the result of the batch processing. For example, the processing unit 13 links the plurality of data items 2a to 2d to which identification information has been assigned, and generates a data column 3. The processing unit 13 then executes processing in one batch with the generated data column 3 as the processing target.

Furthermore, when performing batch processing, the processing unit 13 is able to exclude the identification information from processing targets. As a technique for excluding identification information from processing targets, for example, when linking the plurality of data items 2a to 2d to which identification information has been assigned, the processing unit 13 generates sets including a header in which identification information is set, and a payload in which data is set. The processing unit 13 then executes batch processing with the content of the payloads as the processing targets.

The identification of specific data included in the result of the batch processing is performed when, for example, it is not possible to batch process a plurality of data items. For example, the processing unit 13 refers to the definition information 11a, and determines whether or not batch processing is possible in the first to fourth processes 13a to 13d. Then, prior to execution of the first, second, and fourth processes 13a, 13b, and 13d in which batch processing is possible, if the plurality of data items to which identification information has been assigned are not linked, the processing unit 13 links the plurality of data items to which identification information has been assigned. The processing unit 13 then performs batch processing of the linked data column 3. Furthermore, prior to execution of the third process 13c in which batch processing is not possible, if the plurality of data items to which identification information has been assigned are linked, based on the identification information, the processing unit 13 identifies each of the plurality of data items, and separates the linked data column 3 into data items. The processing unit 13 then performs processing for each data item.

According to this kind of information processing apparatus 10, when the plurality of data items 1a, 1b, 1c, and 1d for which the same processing is to be executed are input, identification information is assigned to each data item by the assignment unit 12. The plurality of data items 2a to 2d having identification information are then passed to the processing unit 13.

In the processing unit 13, for example, processing is executed on the plurality of data items 2a to 2d in accordance with the processing procedure indicated in definition information 11a. According to the definition information 11a depicted in FIG. 1, batch processing of a plurality of data items is possible in the first process 13a that is executed first. Therefore, the processing unit 13 links the plurality of data items 2a to 2d to which identification information has been assigned, and generates the data column 3. In the data column 3, the identification information and the data are alternately arranged, for example. The processing unit 13 then executes the first process 13a on the data column 3. Thereupon, a data column 4 that indicates the processing result of the first process 13a is obtained.

According to the definition information 11a, batch processing of a plurality of data items is possible in the second process 13b that is executed next. Therefore, the processing unit 13 sets the data column 4 resulting from the processing of the first process 13a as a processing target as it is, and executes the second process 13b on the data column 4. Thereupon, a data column 5 that indicates the processing result of the second process 13b is obtained.

According to the definition information 11a, batch processing of a plurality of data items is not possible in the third process 13c that is executed next. Therefore, the processing unit 13 separates the data column 5 resulting from the processing of the second process 13b, into data items 6a to 6d. The processing unit 13 then separately performs the third process 13c with each of the data items 6a to 6d to which identification information has been assigned as a processing target. Thereupon, data items 7a to 7d resulting from the processing of the third process 13c are obtained for each of the data items 6a to 6d.

According to the definition information 11a, batch processing of a plurality of data items is possible in the fourth process 13d that is executed last. Therefore, the processing unit 13 links the plurality of data items 7a, 7b, 7c, and 7d obtained as the processing result of the third process 13c and to which identification information has been assigned, and a data column 8 is generated once more. The processing unit 13 then executes the fourth process 13d on the data column 8 obtained by the linking. Thereupon, a data column 9 that indicates the processing result of the fourth process 13d is obtained.

In this case, in the first to fourth processes 13a to 13d, the identification information is excluded from the processing targets, and only the data is processed. As a result, only the content of the data is updated in the processing results of the first to fourth processes 13a to 13d. For example, the data having the identification information (ID) "1" is updated to "A0", "A1", "A2", "A3", and "A4" each time processing is performed. Even when the content of the data is updated, the identification information assigned to that data is maintained. Thus, based the identification information, it is possible to identify specific data from a processing result. By identifying data items, it becomes possible to separate a data column into data items, for example.

Furthermore, for example, it is also possible to identify specific data included in the result of batch processing if an error has occurred. In this case, for example, the processing unit 13 acquires the identification information of the data in which an error has occurred, from the result of batch processing on a data column obtained by linking. The processing unit 13 then re-executes processing for the data corresponding to the acquired identification information. In this case, for example, the assignment unit 12 stores, in the storage unit 11, the plurality of data items 2a to 2d prior to processing. The processing unit 13 then acquires the data in which the error occurred from the storage unit 11, and re-executes processing (retry).

In this way, according to the first embodiment, based on the identification information, it is possible to identify, from processing results, the processing result for specific data from among the plurality of data items, even when a plurality of data items are processed in one batch. As a result, for example, if it is not possible for batch processing to be performed in some of the processes from among a plurality of processes to be executed, it is possible to, only when those processes are to be executed, separate data into data items to perform the processes. Consequently, even if it is not possible for batch processing to be performed in some of the processes, it is possible for the batch processing of a plurality of data items to be performed for the processes in which batch processing is possible, and efficient processing therefore becomes possible. As a result, the resources of the information processing apparatus 10 are effectively utilized, and the amount of processing per unit time increases.

In addition, even if an error has occurred due to batch processing, it is possible for the erroneous data item to be specified based on the identification information, and the processing for only that data item to be re-executed. As a result, retry processing when an error occurs is performed efficiently.

Furthermore, the assignment unit 12 and the processing unit 13 are, for example, realized by a processor of the information processing apparatus 10. The storage unit 11 is, for example, realized by a memory or a storage device of the information processing apparatus 10. Furthermore, the lines connecting the elements depicted in FIG. 1 represent some of the communication paths, and it is possible to set communication paths other than the communication paths depicted.

Second Embodiment

Next, a second embodiment is described. In the second embodiment, an input message is processed by an ESB.

Configurations in which, in addition to the real-time coordination of jobs, existing batch-processing jobs are linked by using an ESB have increased in recent years. In batch processing, the number of coexisting data transfers in which files are input and output increases, and the following issue in conventional real-time control systems has become prominent.

A plurality of records are included in files that are input and output in batch processing. In the processing of the plurality of records, because messages for each record are processed one at a time as in real-time processing, processing by using the mediation functions is not performed efficiently. Herein, a plurality of messages may be linked, and processing may be performed with a plurality of records as one group. If the plurality of records are processed as one group, it is possible to reduce the preprocessing and post-processing overheads for the mediation functions. For example, in contrast to starting and stopping preprocessing and postprocessing processes for each record when processing is performed for each single record, if a plurality of records are processed as one group, the preprocessing and postprocessing processes are started and stopped only once each.

However, when a plurality of records are processed as one group, it becomes difficult to discern the divisions between the original messages. In this case, for example, if an error occurs in processing, it is not possible for the erroneous record to be specified, all of the plurality of records have to be processed once more, and the processing efficiency deteriorates all the more.

Therefore, in the second embodiment, when records for which the same processing is to be executed are to be processed in one batch in the ESB, identification information is assigned to the records in advance. Consequently, it is possible for the records to be identified from the processing results of the batch processing.

Figure 2:
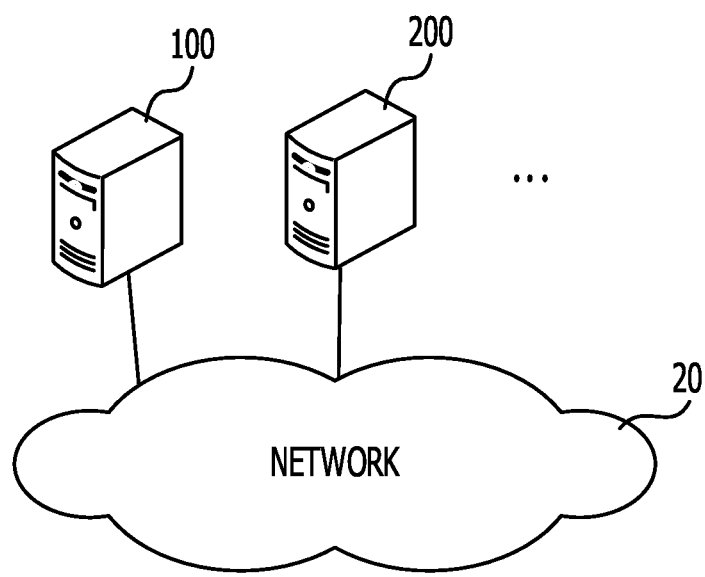
FIG. 2 depicts a system configuration example of a second embodiment.

FIG. 2 depicts a system configuration example of the second embodiment. A plurality of servers 100, 200 . . . are coupled via a network 20. For example, by using an ESB, the server 100 is able to execute processing in which a plurality of services are integrated. Furthermore, for example, the server 200 is able to provide a service in response to a call from the ESB of the server 100.

Figure 3:
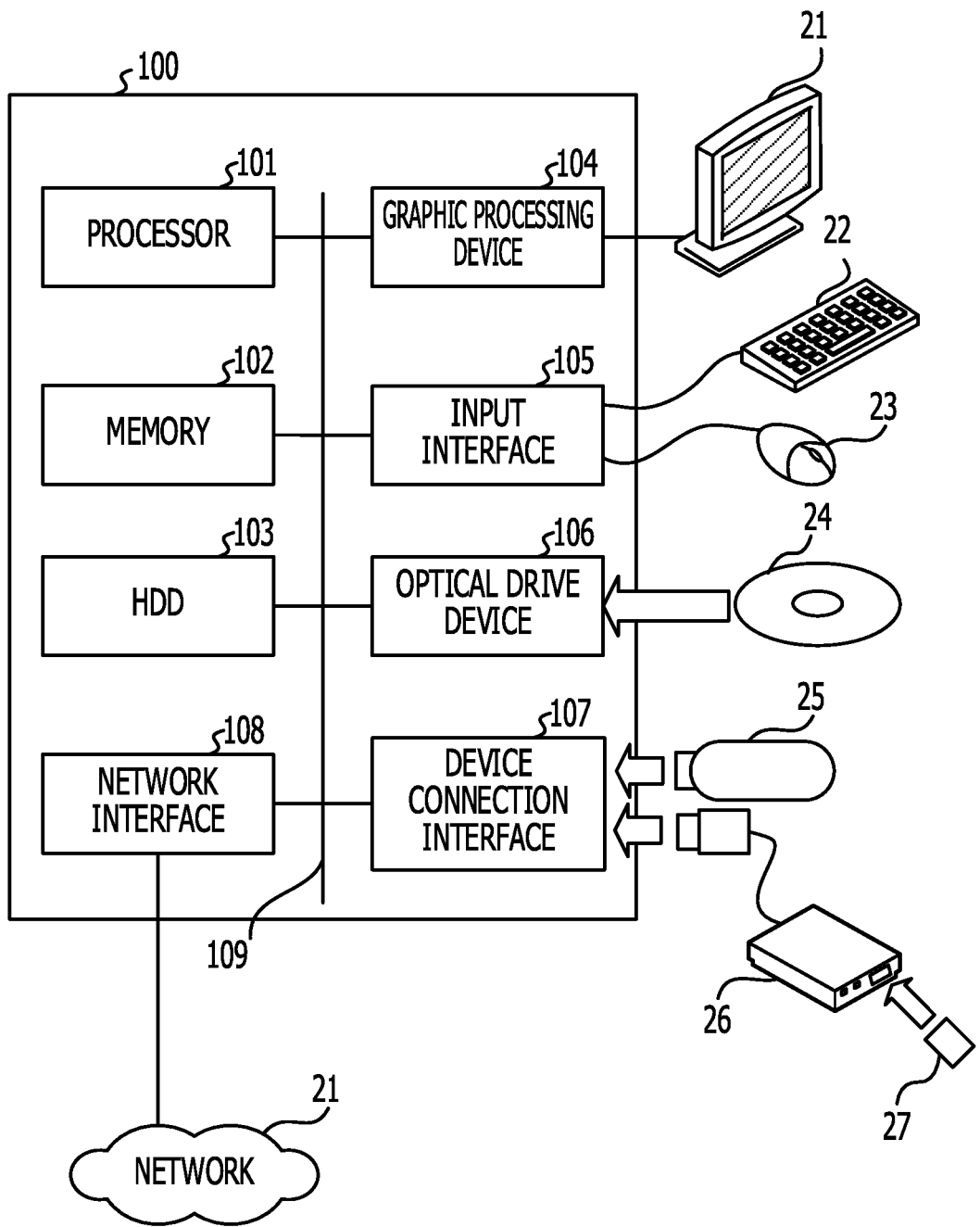
FIG. 3 depicts a configuration example of the hardware of a server used in the second embodiment.

FIG. 3 depicts a configuration example of the hardware of a server used in the second embodiment. In the server 100, the entirety of the device is controlled by a processor 101. A memory 102 and a plurality of peripheral devices are coupled to the processor 101 via a bus 109. The processor 101 may be a multiprocessor. The processor 101 is, for example, a central processing unit (CPU), a micro-processing unit (MPU), or a digital signal processor (DSP). At least some of the functions of the processor 101 may be realized by an electronic circuit such as an application-specific integrated circuit (ASIC) or a programmable logic device (PLD).

The memory 102 is used as a main storage device for the server 100. At least some operating system (OS) programs and application programs executed by the processor 101 are temporarily stored in the memory 102. Furthermore, various data desired for the processing performed by the processor 101 is stored in the memory 102. For example, a volatile semiconductor storage device such as a random-access memory (RAM) is used as the memory 102.

The peripheral devices coupled to the bus 109 include a hard disk drive (HDD) 103, a graphic processing device 104, an input interface 105, an optical drive device 106, a device connection interface 107, and a network interface 108.

The HDD 103 magnetically reads and writes data to a disk incorporated therein. The HDD 103 is used as an auxiliary storage device for the server 100. OS programs, application programs, and various data are stored in the HDD 103. Furthermore, it is also possible for a nonvolatile semiconductor storage device such as a flash memory to be used as an auxiliary storage device.

A monitor 21 is coupled to the graphic processing device 104. The graphic processing device 104 causes an image to be displayed on the screen of the monitor 21, in accordance with a command from the processor 101. The monitor 21 may be a display device in which a cathode ray tube (CRT) is used or a liquid crystal display device or the like.

A keyboard 22 and a mouse 23 are coupled to the input interface 105. The input interface 105 transmits, to the processor 101, signals sent from the keyboard 22 and the mouse 23. It ought to be noted that the mouse 23 is an example of a pointing device, and it is also possible to use other pointing devices. Examples of other pointing devices are a touch panel, a tablet, a touchpad, and a trackball and so forth.

The optical drive device 106 uses laser light or the like, and reads data recorded on an optical disc 24. The optical disc 24 is a portable recording medium on which data is recorded in such a way that it is possible for the data to be read by the reflection of light. The optical disc 24 may be a digital versatile disc (DVD), a DVD-RAM, a compact disc read-only memory (CD-ROM), a compact disc-recordable (CD-R), or a compact-disc rewritable (CD-RW) or the like.

The device connection interface 107 is a communication interface for coupling peripheral devices to the server 100. For example, it is possible to couple a memory device 25 and a memory reader/writer 26 to the device connection interface 107. The memory device 25 is a recording medium equipped with a function for communicating with the device connection interface 107. The memory reader/writer 26 is a device that writes data to a memory card 27, or reads data from the memory card 27. The memory card 27 is a card-type recording medium.

The network interface 108 is coupled to the network 20. The network interface 108 transmits and receives data with other computers or communication equipment, via the network 20.

It is possible to realize the processing functions of the second embodiment by using a hardware configuration such as that described above. Furthermore, it is also possible for the devices indicated in the first embodiment to be realized by using hardware that is the same as the server 100 depicted in FIG. 3.

The server 100 realizes the processing functions of the second embodiment by executing a program recorded on a computer-readable recording medium, for example. It is possible for programs in which the processing content to be executed by the server 100 is described to be recorded on a variety of recording media. For example, it is possible for programs that are to be executed by the server 100 to be stored on the HDD 103. The processor 101 loads at least some of the programs on the HDD 103 into the memory 102, and executes the programs. Furthermore, it is possible for programs that are to be executed by the server 100 to be recorded on a portable recording medium such as the optical disc 24, the memory device 25, and the memory card 27. It is possible for programs that are stored on a portable recording medium to be, for example, executed by control from the processor 101 after having been installed on the HDD 103. Furthermore, the processor 101 is able to read and execute programs directly from the portable recording medium.

Figure 4:
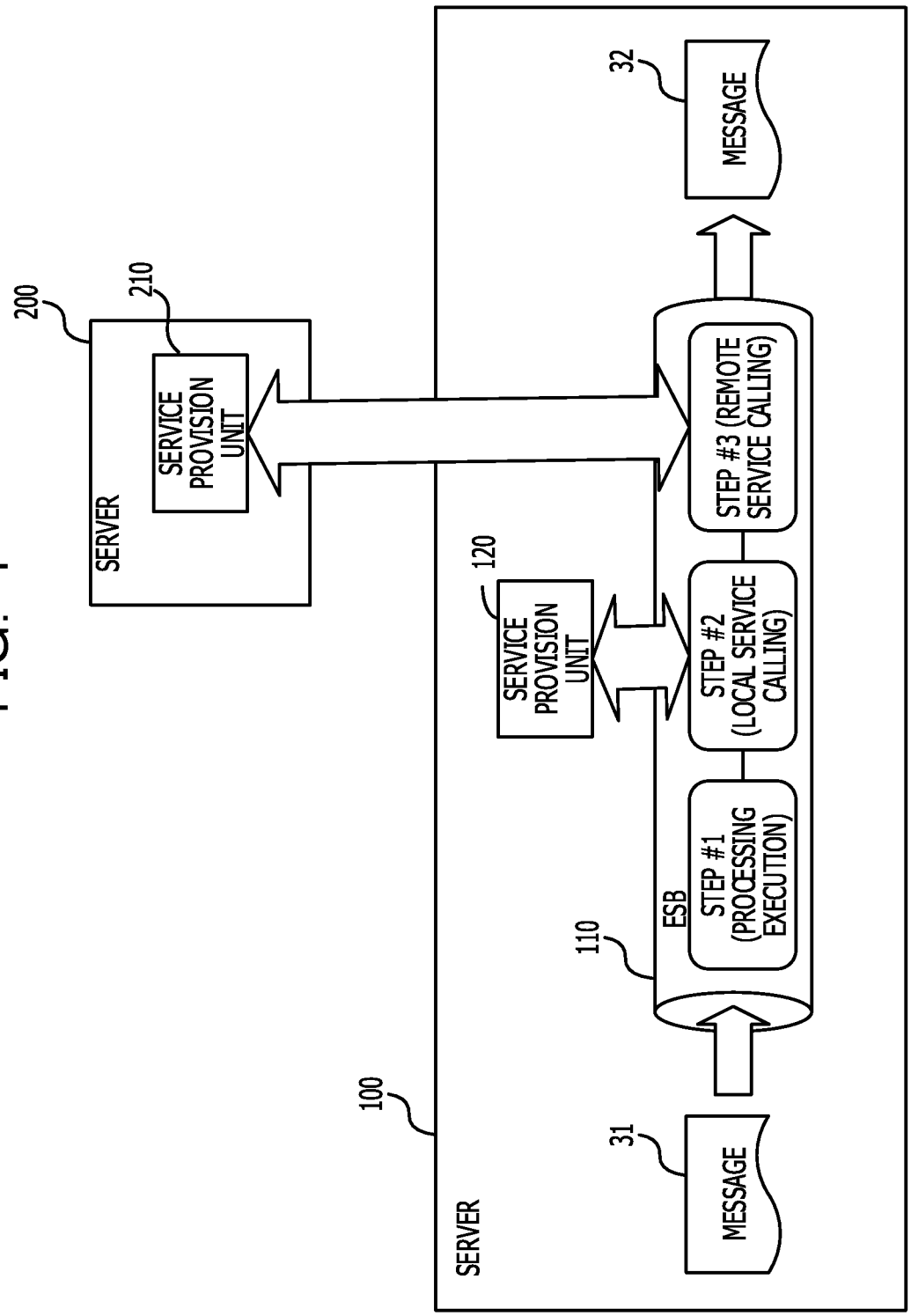
FIG. 4 depicts an execution example of processing performed by an ESB.

FIG. 4 depicts an execution example of processing performed by an ESB. The server 100 executes processing on an input message 31 by using an ESB 110, and outputs a message 32 resulting from the processing. In the ESB 110, for example, the procedure (sequence) for the processing is defined in advance, and the message 31 is executed in accordance with that sequence. The sequence includes, as mediation functions (mediator functions), processing that is executed within the ESB 110, and processing for calling other services. The processing for calling other services includes processing for calling a local service, and processing for calling a remote service.

This processing for calling a local service is provided by a service provision unit 120 in the server 100, for example, and this processing for calling a remote service is provided by a service provision unit 210 in the external server 200, for example.

Furthermore, the service provision units 120 and 210 of the servers 100 and 200 are, for example, processing functions that are realized by the servers 100 and 200 executing application software.

In the example of FIG. 4, processing that is executed in the ESB 110 is defined in the first step (step #1) of the sequence. Thus, when the message 31 is input, first, processing is executed for that message 31 by a function of the ESB 110.

The next step (step #2) is processing (local service call) in which the service provision unit 120 provided by the server 100 is used. The ESB 110 calls the service provision unit 120, and passes the execution result of the processing of the first step (step #1) as a processing target. Thereupon, the processing of the service provision unit 120 is executed by the server 100, and the processing result is returned to the ESB 110.

The next step (step #3) is processing (remote service call) in which the service provision unit 210 provided by the server 200 is used. The ESB 110 calls the service provision unit 210 within the server 200, and passes the execution result of the processing of the second step (step #2) as a processing target. Thereupon, the processing of the service provision unit 210 is executed by the server 200, and the processing result is returned to the ESB 110.

The ESB 110 outputs, as the message 32, the result obtained by performing all of the processing defined in the sequence.

In the second embodiment, it is possible for a plurality of records to be batch processed in this kind of ESB 110. Moreover, in the second embodiment, it is possible to easily extract the processing result for a desired record from the results obtained by performing batch processing. Consequently, for example, if processing which uses a service provision unit that is not capable of batch processing a plurality of records is included in the sequence, it is possible for a plurality of messages for each single record to be executed by that service provision unit, only when that service provision unit is used.

Figure 5:
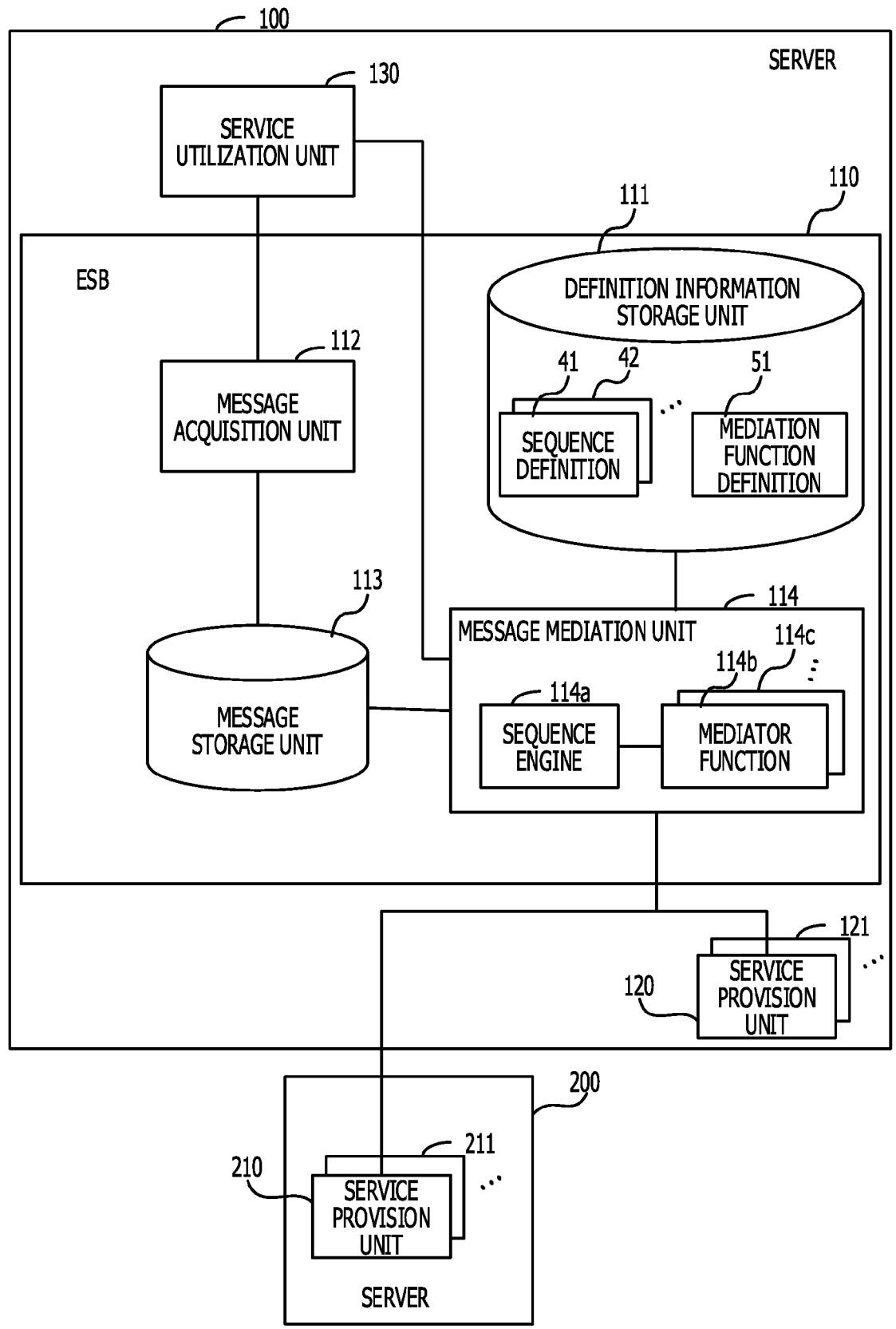
FIG. 5 depicts an example of the functions of the second embodiment.

FIG. 5 depicts an example of the functions of the second embodiment. The server 100 has the ESB 110, a plurality of service provision units 120, 121 . . . , and a service utilization unit 130. Furthermore, the server 200 has a plurality of service provision units 210, 211 . . . .

The service provision units 120, 121 . . . of the server 100 execute processing for a message in response to a call from the ESB 110, and return the processing result to the ESB 110. Likewise, the service provision units 210, 211 . . . of the server 200 execute processing for a message in response to a call from the ESB 110, and return the processing result to the ESB 110. Among these service provision units, there are service provision units that are able to process a plurality of records in one batch, and there are service provision units that are only able to process one record at a time. For example, in the case of the service provision units 120, 121 . . . within the server 100, the administrator of the server 100 is able to make improvements in such a way that it is possible for a plurality of records to be processed in one batch. However, there are cases where the server 200 coupled via the network 20 is not managed by the administrator of the server 100. In these cases, if the service provision units 210, 211 . . . of the server 200 are able to process only one record at a time, calls are made from the server 100 with one record at a time as a processing target.

The service utilization unit 130 outputs, to the ESB 110, messages to be processed by the ESB 110. The messages, for example, include only one record for example as a processing target. The service utilization unit 130 is able to output a file including a plurality of records to the ESB 110, and requests the ESB 110 to perform processing for the records within that file. Furthermore, when a message is output to the ESB 110, the service utilization unit 130 designates a sequence for the processing to be executed on that message. For example, the service utilization unit 130 designates a sequence for the processing to be executed on the message by notifying the ESB 110 of information that specifies a sequence definition for the sequence to be executed.

The ESB 110 receives the message input from the service utilization unit 130. The ESB 110 then executes processing on the input message in accordance with a preset sequence, and outputs the message resulting from the processing to the service utilization unit 130. In order to execute this kind of processing, the ESB 110 has a definition information storage unit 111, a message acquisition unit 112, a message storage unit 113, and a message mediation unit 114.

The definition information storage unit 111 has a plurality of sequence definitions 41, 42 . . . and a mediation function definition 51. The sequence definitions 41, 42 . . . are information indicating procedures for a series of a plurality of processes. The mediation function definition 51 indicates information relating to mediation functions that are able to be called in the ESB 110.

The message acquisition unit 112 acquires a message from the service utilization unit 130. The message acquisition unit 112 then assigns identification information (message ID) to the acquired message. The message acquisition unit 112 then stores the message to which the message ID has been assigned, in the message storage unit 113. Furthermore, if a message is acquired in which a file including a plurality of records is designated as a processing target, the message acquisition unit 112 divides the individual records within that file into separate messages. The message acquisition unit 112 then assigns a message ID to the messages for each record within the file, and stores the messages in the message storage unit 113.

The message storage unit 113 stores messages to which message IDs have been assigned. The messages stored in the message storage unit 113 are deleted when the processing for those messages finishes, for example.

The message mediation unit 114 mediates messages transferred between the service utilization unit 130 and the service provision units 120, 121, 210, 211 . . . , and among the service provision units 120, 121, 210, 211 . . . . For example, the message mediation unit 114 mediates messages in accordance with a predetermined sequence. When mediating a message, the message mediation unit 114 is able to perform a variety of processing on the data within the message being mediated. The message mediation unit 114 has, for example, a sequence engine 114a and a plurality of mediator functions 114b, 114c . . . . The sequence engine 114a interprets a sequence definition, and calls mediator functions according to the procedure indicated in the sequence definition. The mediator functions 114b, 114c . . . perform service calling, data conversion, data editing, and message routing and so forth. For example, the message mediation unit 114 acquires, from the definition information storage unit 111, a sequence definition corresponding to a sequence designated from the service utilization unit 130. Next, based on the acquired sequence definition, the message mediation unit 114 recognizes the mediator functions to be executed within the sequence.

In addition, the message mediation unit 114 refers to mediation function definitions corresponding to the mediator functions to be executed, within the definition information storage unit 111, and determines whether the mediator functions are able to process a plurality of records in one batch. The message mediation unit 114 then controls the execution of processing according to the designated sequence. At such time, the message mediation unit 114 causes the mediator functions that are able to batch process a plurality of records to execute batch processing of a plurality of records. Meanwhile, the message mediation unit 114 causes the mediator functions that are not able to batch process a plurality of records to execute processing for each message having one record. In the embodiments, hereafter, the batch processing of a plurality of records being possible is referred to as being multi-record compatible, and the batch processing of a plurality of records not being possible is referred to as being multi-record non-compatible. When processing according to a sequence finishes, the message mediation unit 114 transmits the processed message to the service utilization unit 130.

Furthermore, if an error has occurred as a result of the batch processing of a plurality of records being executed, the message mediation unit 114 specifies the record that caused the error, from among the plurality of records. The message mediation unit 114 then executes the processing of the sequence once more for only the record that caused the error.

By using a system having this kind of configuration, it is possible for efficient processing according to a predetermined sequence to be performed in combination with the batch processing of a plurality of records. The content of a sequence is indicated in a sequence definition. It ought to be noted that the lines connecting the elements depicted in FIG. 5 represent some of the communication paths, and it is possible to set communication paths other than the communication paths depicted. Furthermore, the message storage unit 113 and the definition information storage unit 111 are examples of the storage unit 11 of the first embodiment depicted in FIG. 1. The message acquisition unit 112 is an example of the assignment unit 12 of the first embodiment depicted in FIG. 1. The message mediation unit 114 is an example of the processing unit 13 of the first embodiment depicted in FIG. 1.

Figure 6:
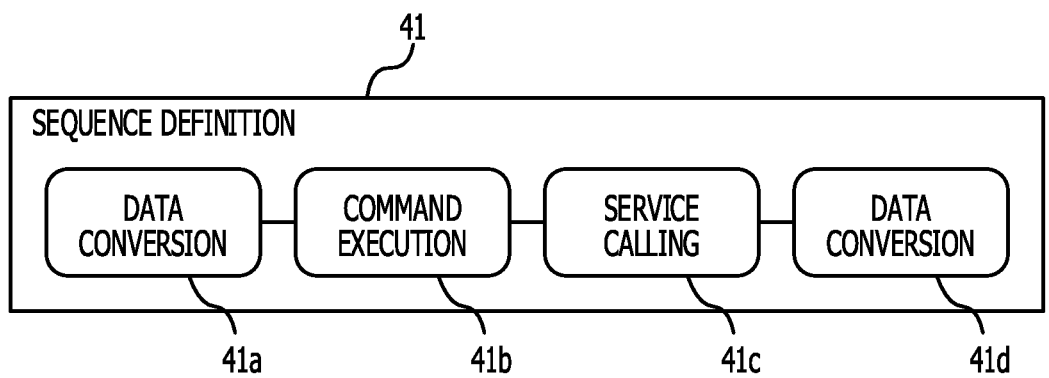
FIG. 6 depicts an example of a sequence definition.

FIG. 6 depicts an example of a sequence definition. For example, the processing order of a plurality of mediator functions 41a to 41d is defined in the sequence definition 41. The sequence definition 41 depicted in FIG. 6 indicates that the mediator functions are executed in the order of data conversion, command execution, service calling, and data alteration.

When the message mediation unit 114 calls a mediator function, the method for calling the mediator function is different depending on whether or not the calling-target mediator function is able to process a plurality of records in one batch. Whether or not a mediator function is able to process a plurality of records in one batch is indicated in the mediation function definition.

Figure 7:
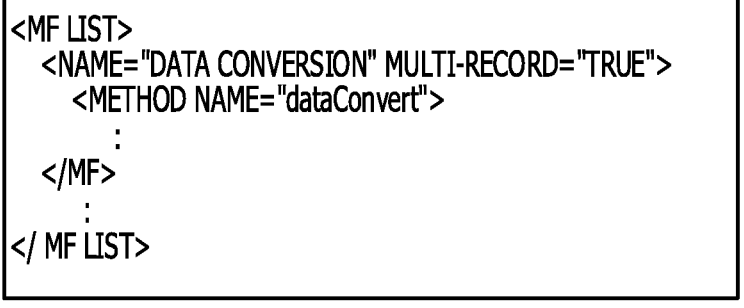
FIG. 7 depicts an example of a mediation function definition.

FIG. 7 depicts an example of a mediation function definition. The mediation function definition 51 has a structured document format in which extensible markup language (XML) tags are used. In the example of FIG. 7, below an "MF list" tag, information relating to characteristics of the mediation functions and so forth is set by using an "MF" tag. For example, a name and whether the batch processing of a plurality of records is possible are indicated in the "MF" tag. For example, if the value of a "multi-record" variable for a mediator function is "true", that mediator function is multi-record compatible. Furthermore, if the value of the "multi-record" variable for a mediator function is "false", that mediator function is multi-record non-compatible. It is possible to determine whether or not a mediator function is multi-record compatible by referring to this kind of mediation function definition 51.

Furthermore, the sequence definitions 41, 42 . . . and the mediation function definition 51 are created in advance and stored in the definition information storage unit 111 by the administrator of the server 100. While the sequence definitions 41, 42 . . . and the mediation function definition 51 are stored in the definition information storage unit 111, the ESB 110 receives the input of messages from the service utilization unit 130. Furthermore, the ESB 110 is able to receive the input of a file including a plurality of records, as a processing target.

When the ESB 110 receives a message or has read a file, the message acquisition unit 112 sets the message or one record within the file as one message, and stores the message in the message storage unit 113. At such time, the message acquisition unit 112 assigns a message ID to the message. Hereafter, a procedure for message storage processing is described.

Figure 8:
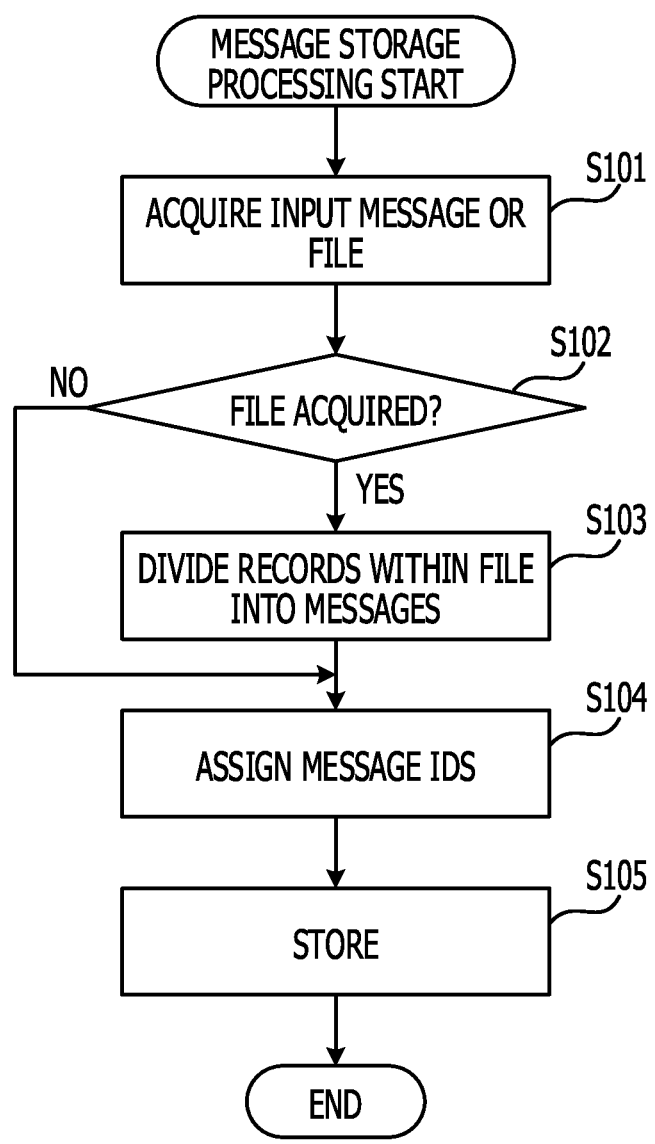
FIG. 8 depicts an example of a procedure for message storage processing.

FIG. 8 depicts an example of a procedure for message storage processing.

[Step S101] The message acquisition unit 112 acquires a message that has been input, or a file that has been designated as a processing target.

[Step S102] The message acquisition unit 112 determines whether or not the acquired item is a file. If the acquired item is a file, processing proceeds to step S103. If the acquired item is a message, processing proceeds to step S104.

[Step S103] The message acquisition unit 112 divides the records within the acquired file into a plurality of messages for each single record. For example, if a record boundary code has been defined in advance, the message acquisition unit 112 divides the information within the file with the boundary code as a boundary, and recognizes, as records, the individual information items obtained by the dividing. The message acquisition unit 112 then sets each of the records extracted from the file as messages. A newline character is an example of a record boundary code. Furthermore, there are also cases where the data format (data length and so forth) of one record is determined in advance. In these cases, the message acquisition unit 112, for example, extracts information conforming to the data format from the head portion of the information within the file. Consequently, it is possible for records included within the file to be extracted.

[Step S104] The message acquisition unit 112 assigns message IDs to the messages.

[Step S105] The message acquisition unit 112 stores the messages having message IDs in the message storage unit 113. At this time, the message acquisition unit 112 sets, to a message for example, a flag indicating the processing status of the message.

The messages are stored in this way.

Figure 9:
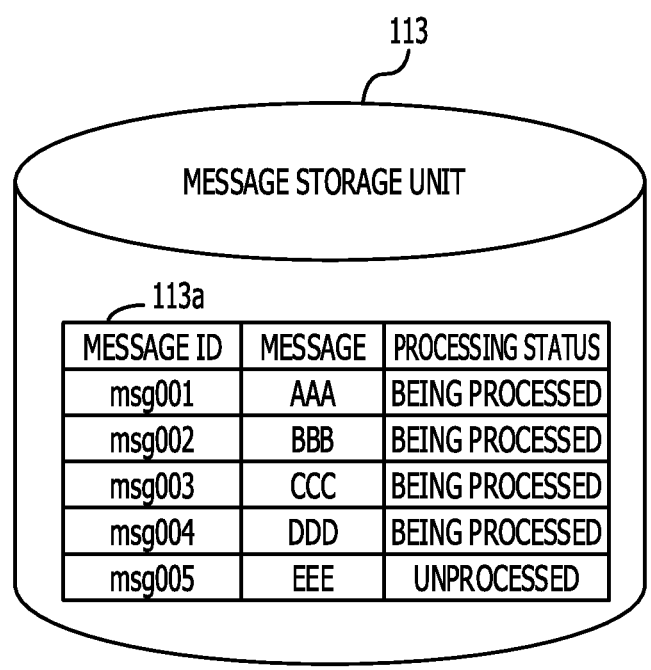
FIG. 9 depicts an example of messages stored in a message storage unit.

FIG. 9 depicts an example of messages stored in a message storage unit. A message management table 113*a* is provided in the message storage unit 113. Message ID, message, and processing status columns are provided in the message management table 113*a*.

The message IDs assigned to the messages are set in the message ID column. The messages corresponding to the message IDs are set in the message column. The processing statuses of registered messages are set in the message status column. The processing statuses are "unprocessed" and "being processed", for example. The initial value of the processing status is "unprocessed". The processing status of a message for which the execution of processing has started is updated to "being processed". Furthermore, messages for which processing has been completed are deleted from the message management table 113*a*.

When a message is stored in the message storage unit 113, processing for messages having the "unprocessed" processing status is executed by the message mediation unit 114. At such time, if there are a plurality of "unprocessed" messages for which the same sequence is to be applied, the message storage unit 113 processes those messages in one batch. For example, messages that correspond to each of a plurality of records extracted from the same file are messages for which the same sequence is to be applied.

When the messages are processed, first, based on the sequence definition of the sequence to be applied, and the mediation function definitions of the mediator functions to be executed within that sequence, the message mediation unit 114 determines the processing content of the sequence. The message mediation unit 114 then inserts linking processing or separation processing for the messages in accordance with whether or not the mediator functions to be executed are multi-record compatible.

Figure 10:
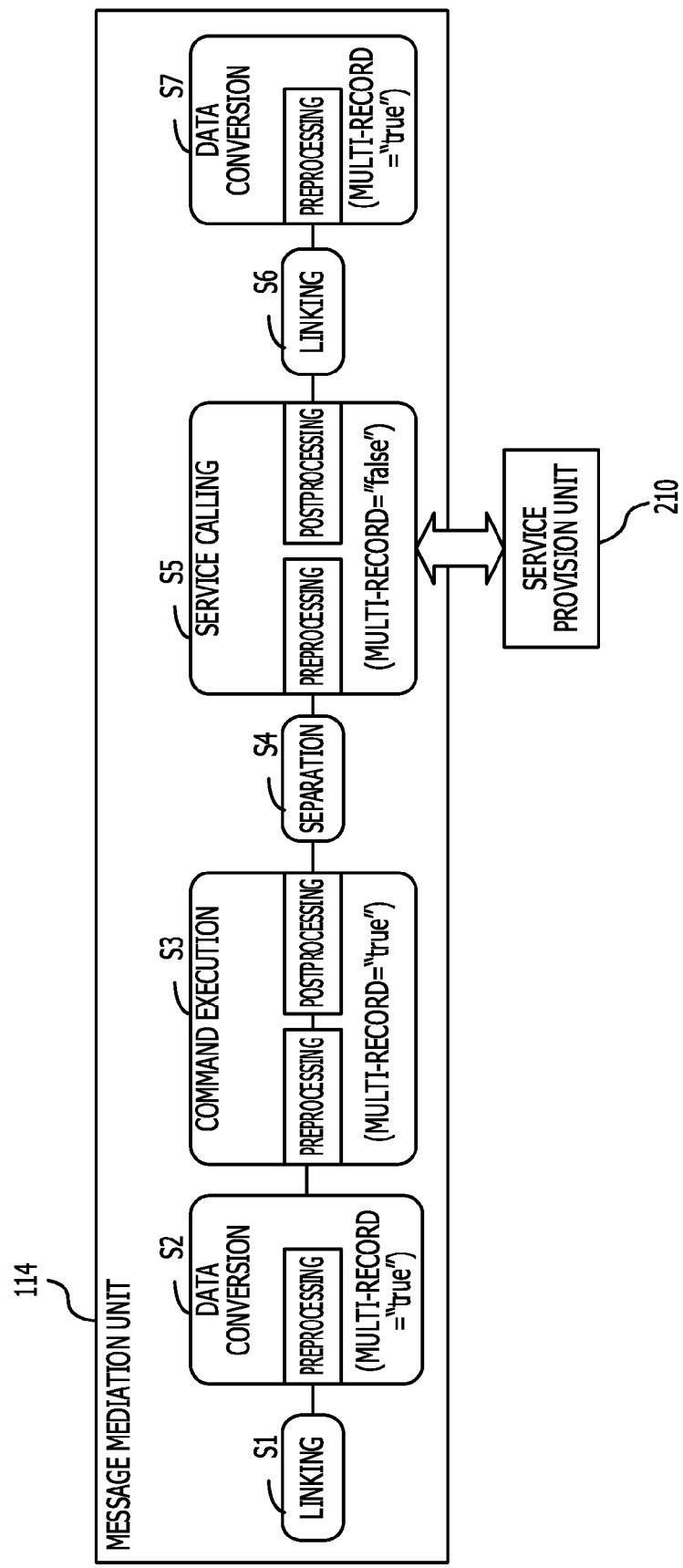
FIG. 10 depicts an example of message mediation processing.

FIG. 10 depicts an example of message mediation processing. FIG. 10 depicts an example of when message mediation processing according to the sequence definition 41 depicted in FIG. 6 is executed. From among the mediator functions 41*a* to 41*d* indicated in the sequence definition 41, the mediator functions 41*a*, 41*b*, and 41*d* for data conversion and command execution are multi-record compatible. Furthermore, the mediator function 41*c* for service calling is multi-record non-compatible.

The message mediation unit 114 acquires a message having an "unprocessed" processing status from the message storage unit 113, and changes the processing status of that message to "being processed". Then, because the data conversion processing to be executed first is multi-record compatible, the message mediation unit 114, first, links a plurality of processing-target messages (step S1). When the messages are being linked, the message mediation unit 114 links sets of messages and message IDs. For example, the message mediation unit 114 sets each message to follow the corresponding message ID.

Next, the message mediation unit 114 performs data conversion processing in one batch with respect to the records within the plurality of linked messages (step S2). Furthermore, in the data conversion processing, preprocessing is performed on the input messages. When the plurality of messages are to be processed in one batch, the message mediation unit 114 starts one process that executes preprocessing, and uses that process to perform preprocessing for the plurality of messages. The plurality of messages that have been subjected to data conversion are output in a linked state.

When the data conversion finishes, the message mediation unit 114 executes a predetermined command on the messages that have been subjected to data conversion (step S3). Since the mediator function 41*b* for command execution is also multi-record compatible, the message mediation unit 114 performs command execution processing for the plurality of messages with those messages still being linked. Then, the plurality of messages that have been subjected to command execution are output in a linked state. Furthermore, in the command execution, preprocessing and postprocessing are performed. Since command execution is multi-record compatible, and a plurality of linked messages are input, it is possible for the preprocessing and the postprocessing to be collectively executed in one process each.

The mediator function to be executed next is multi-record non-compatible, and therefore the message mediation unit 114 separates the plurality of linked messages into separate messages (step S4). The separation of the messages is performed based on the message IDs of the messages. For example, in a linked message group, if each message has been set to follow the corresponding message ID, the message mediation unit 114 sets boundaries immediately preceding the message IDs, and separates the message group into a plurality of messages.

The message mediation unit 114 performs service calling for each separated message (step S5). In the service calling, for example, the calling of services is performed with respect to the service provision unit 210 within the server 200. The service provision unit 210 executes a service for each message, and returns the execution result to the message mediation unit 114. The plurality of messages that have been subjected to the execution of service calling are then output one message at a time. Furthermore, in the service calling, preprocessing and postprocessing are performed. The service calling is multi-record non-compatible, and the plurality of messages are input separately. At such time, the preprocessing and the postprocessing for the service calling are executed by processes for input each message. Thus, processes are frequently started and stopped.

The data conversion processing that is executed last is multi-record compatible. Therefore, the message mediation unit 114 links the plurality of records that are output as the processing result of the service calling (step S6). The message mediation unit 114 then executes data conversion processing in one batch with respect to the plurality of linked records (step S7). Furthermore, when data conversion processing is performed, the preprocessing for the plurality of records is performed in one batch.

When the data conversion processing finishes, the message mediation unit 114 outputs the result of the sequence processing. At this time, the message mediation unit 114 deletes the messages for which processing has been executed, from the message storage unit 113.

Figure 11:
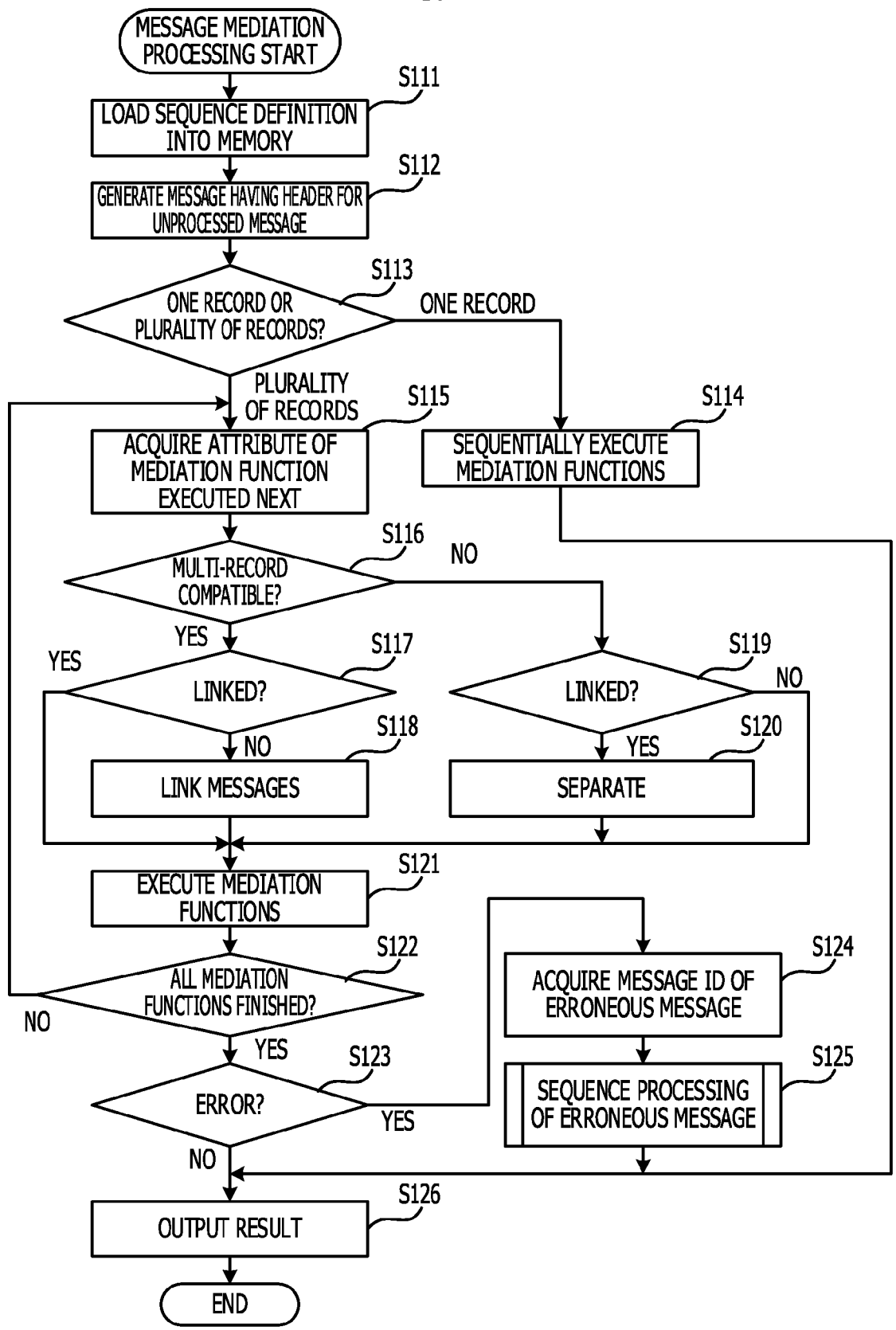
FIG. 11 is a flowchart depicting an example of a procedure for message mediation processing.

Next, a procedure for message mediation processing in the message mediation unit 114 is described. FIG. 11 is a flowchart depicting an example of a procedure for message mediation processing.

[Step S111] The message mediation unit 114 acquires an unprocessed message from the message storage unit 113, and loads, into the memory 102, the sequence definition for the sequence designated in that message.

[Step S112] The message mediation unit 114 generates a message having a header for the unprocessed message. For example, the message mediation unit 114 links a payload that includes the message to a header that includes a message ID, and generates a message having a header.

[Step S113] The message mediation unit 114 determines whether there is one or a plurality of records included in the unprocessed message. If there is one record, processing proceeds to step S114. If there are a plurality of records, processing proceeds to step S115.

[Step S114] If there is only one record, the message mediation unit 114 sequentially executes mediator functions in accordance with the sequence definition, with respect to the message including that record. Thereafter, processing proceeds to step S126.

[Step S115] If there are a plurality of records, the message mediation unit 114 acquires a "multi-record" attribute from the mediation function definition of the mediator function to be executed next.

[Step S116] The message mediation unit 114 determines whether or not the mediator function to be executed next is multi-record compatible. If the "multi-record" attribute is set to "true" for example, that mediator function is multi-record compatible. Furthermore, if the "multi-record" attribute is set to "false", that mediator function is multi-record non-compatible. If the mediator function is multi-record compatible, processing proceeds to step S117. If the mediator function is multi-record non-compatible, processing proceeds to step S119.

[Step S117] The message mediation unit 114 determines whether or not the plurality of messages are linked. If the plurality of messages are linked, processing proceeds to step S121. If the plurality of messages are not linked, processing proceeds to step S118.

[Step S118] If the plurality of messages are not linked and the mediator function to be executed next is multi-record compatible, the message mediation unit 114 links those messages. Thereafter, processing proceeds to step S121.

[Step S119] The message mediation unit 114 determines whether or not the plurality of messages are linked. If linked, processing proceeds to step S120. If not linked, processing proceeds to step S121.

[Step S120] If the plurality of messages are linked and the mediator function to be executed next is multi-record non-compatible, the message mediation unit 114 separates those messages into separate messages.

[Step S121] The message mediation unit 114 executes the next mediator function in the processing order of the sequence definition, with respect to the records within the messages. At such time, if the plurality of messages are linked, the message mediation unit 114 processes the plurality of records within the linked messages in one batch. Furthermore, if the plurality of messages are not linked, the message mediation unit 114 separately processes the single records within each individual message.

Furthermore, if the plurality of messages are linked, the message mediation unit 114 distinguishes between the headers and the payloads of messages having a header. For example, the message mediation unit 114 recognizes portions surrounded by tags indicating a header as headers, and recognizes portion surrounded by tags indicating a payload as payloads. The message mediation unit 114 excludes the information within the headers from processing, and executes processing on the information within the payloads.

[Step S122] The message mediation unit 114 determines whether or not the execution of all of the mediator functions to be executed has finished. If the execution of all of the mediator functions has finished, processing proceeds to step S123. If there is a mediator function that has not been executed, processing proceeds to step S115.

[Step S123] The message mediation unit 114 determines whether or not an error has occurred due to the execution of all of the mediator functions. If an error has occurred, processing proceeds to step S124. If an error has not occurred, processing proceeds to step S126.

[Step S124] If an error has occurred, the message mediation unit 114 acquires the message ID of the erroneous message. For example, when an error has occurred in the processing of a record, a mediator function of the message mediation unit 114 inserts an error code into the payload in which that record is stored, and this serves as the processing result. The sequence engine 114a then acquires the message ID from the header of the message including the payload in which the error code has been set. The message mediation unit 114 that has acquired the message ID of the erroneous message displays the message ID of the message in which an error has occurred, on an operation management screen displayed on the monitor 21. When a retry instruction is input from the administrator, the message mediation unit 114 advances processing to step S125.

[Step S125] The message mediation unit 114 executes sequence processing as depicted in FIG. 11, with respect to the erroneous message.

[Step S126] The message mediation unit 114 outputs the result of the processing executed in accordance with the sequence. At this time, the message mediation unit 114 deletes messages for which processing has been performed, from the message storage unit 113.

In this way, efficient processing in the ESB 110 is performed. For example, if a file including a plurality of records has been input, mediator function are efficiently executed by generating messages for each record, and appropriately executing the linking and separation of those messages.

Figure 12:
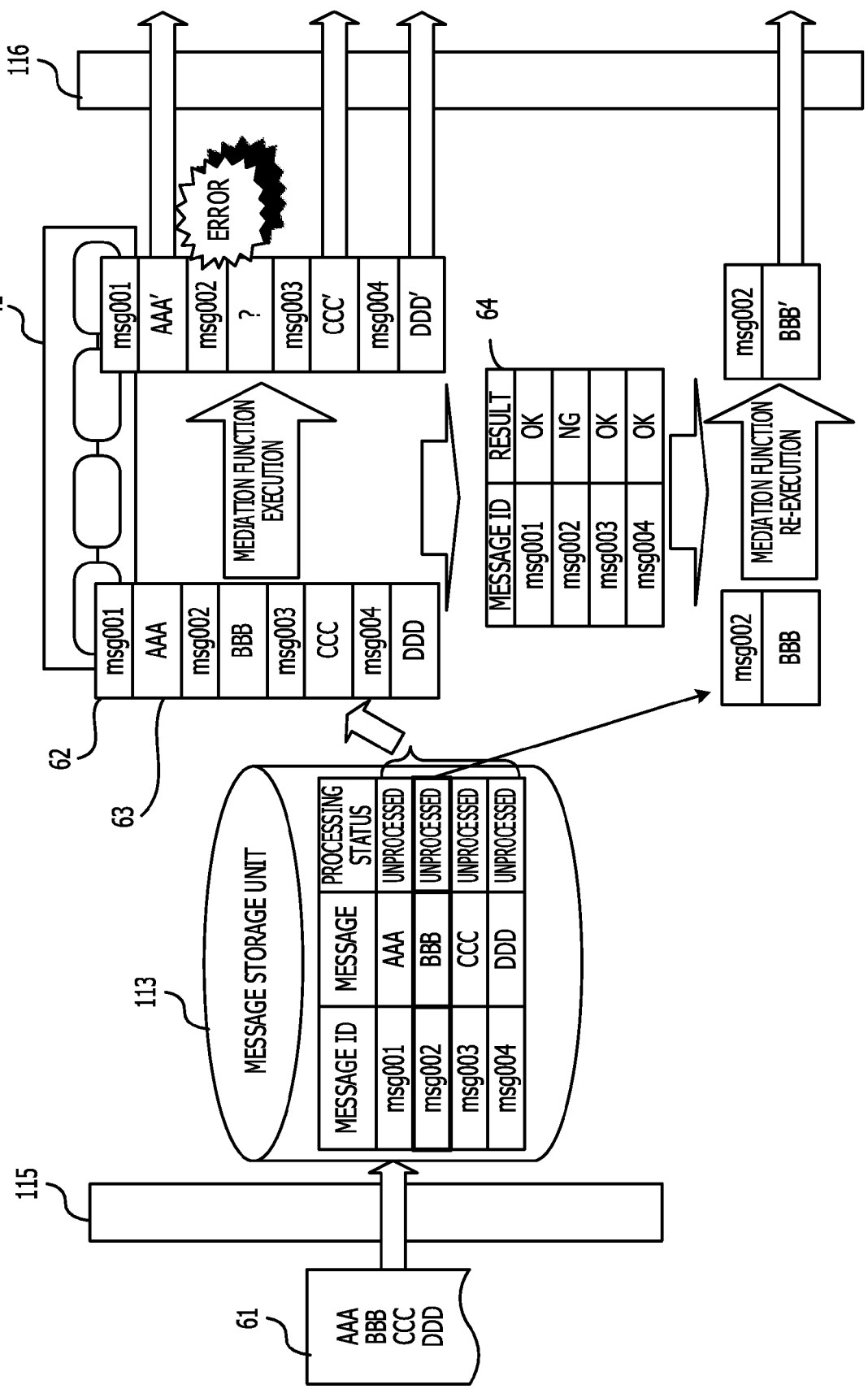
FIG. 12 depicts an example of processing in an ESB.

FIG. 12 depicts an example of processing in an ESB. In the example of FIG. 12, a file 61 that includes a plurality of records is input to an endpoint 115 provided in the ESB 110. The endpoint 115 is an information transfer interface for inputting a message or a file from the service utilization unit 130 to the ESB 110. The file 61 input to the endpoint 115 is acquired by the message acquisition unit 112. The records within the input file 61 are then extracted and messages for each record are generated by the message acquisition unit 112. In addition, message IDs are assigned to the messages by the message acquisition unit 112. Sets of message IDs and messages are then stored in the message storage unit 113 by the message acquisition unit 112. When a set of a message ID and a message is stored, the processing status of that message is "unprocessed". In the example of FIG. 12, four messages are stored.

When it is confirmed that messages corresponding to each of the plurality of records extracted from the one file 61 have been stored, the message mediation unit 114 extracts the messages from the message storage unit 113. During this process, the message mediation unit 114 links headers 62 that include message IDs and payloads 63 that include messages, and forms messages having message IDs. The message mediation unit 114 then links the plurality of messages having message IDs, and executes mediator functions in the order indicated in the sequence definition 41. In the mediator functions, processing is performed on the content of the payloads 63, and the headers 62 do not change.

When the execution of all of the mediator functions indicated in the sequence definition 41 have been completed, the message mediation unit 114 outputs the processing result for each message to a log 64. In the log 64, for example, whether the result of the processing is success (OK) or failure (NG) is set in association with the message ID. For example, if the content of the log 64 is displayed on the operation management screen, it is possible for the administrator to confirm the processing results in units of records. If there is a message for which processing has failed, the message mediation unit 114 reacquires only that message from the message storage unit 113. The message mediation unit 114 then re-executes the mediator functions with respect to the reacquired message. In the example of FIG. 12, because an error has occurred in processing for the message having the message ID "msg002", the mediator functions are re-executed with respect to that message.

The messages for which all of the mediator functions have been executed are output via an output-side endpoint 116 by the message mediation unit 114.

In this way, according to the second embodiment, processing is efficiently executed by linking a plurality of messages when multi-record compatible mediator functions are executed. For example, if a plurality of messages are processed separately, preprocessing and postprocessing processes have to be started for each message. As a result, the number of times that processes are started and finished increases, and processing efficiency is therefore poor. As in the second embodiment, if a plurality of messages are linked and treated as a single processing target, the preprocessing and postprocessing processes are both started and finished once each, and there is an improvement in processing efficiency.

Moreover, in the second embodiment, message IDs are assigned to each linked message. It then becomes possible to identify individual messages within a linked message group by using those message IDs as keys. Consequently, for example, if there is a multi-record non-compatible mediator function among some of a plurality of mediator functions, the messages may simply be separated only when the multi-record non-compatible mediator function is executed. As a result, a plurality of messages are able to be processed in one batch to the extent possible, and there is an improvement in processing efficiency.

In addition, in the second embodiment, it is possible for only a desired message to be extracted from among a plurality of linked messages by using the message ID. For example, when the mediator functions are being executed, there are cases where an error occurs in the processing of some of the messages. In such a case, the message in which an error has occurred is extracted from among the plurality of linked messages, and the processing of the sequence is executed once more for only that message. Consequently, re-execution processing when an error has occurred is performed efficiently.

Furthermore, there are cases where the records to be processed by the ESB 110 are, for example, records that have been extracted from a database that is able to be accessed on a network. Records that are stored in a database coupled to a network are accessed from a large number of devices. Thus, the assigning of headers to the records when the records are stored in the database involves changing the data structure. Since it no longer becomes possible for searches to be performed when the data structure is changed, it is not possible to assign headers within the database. In the second embodiment, after records have been input to the ESB 110, headers that include message IDs are assigned to the records. Consequently, even if processing is performed on the records within the database, it is possible to avoid the data format of a record being changed and it no longer being possible for searches to be performed.

The embodiments have been exemplified above; however, it is possible for the configurations of the units indicated in the embodiments to be substituted with other configurations having the same functions. Furthermore, other desired components and steps may be added. In addition, two or more desired configurations (features) from among the aforementioned embodiments may be combined.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A data processing method comprising:
   determining a plurality of data items included in execution-target data for which a same series of a plurality of processes is to be executed for the plurality of data items;
   associating identification information with respective data items among the plurality of data items;
   referring to definition information in which it is defined whether batch processing is possible for each of the plurality of processes;
   executing, based on the referring for processes in which batch processing is possible from among the plurality of processes, batch processing of the plurality of data items with which the identification information has been associated;
   identifying, based on the identification information, a processing result of at least one of the respective data items among the plurality of data items included in a result of the batch processing;
   determining, based on the referring, processes in which batch processing is not possible from among the plurality of processes;
   when the plurality of data items with which the identification information has been associated are linked, for the processes in which the batch processing is not possible, separating the plurality of linked data items into separate data items, based on the identification information; and
   executing the processes in which the batch processing is not possible, for each of the separate data items.

2. The data processing method according to claim 1, further comprising:
   when the plurality of data items with which the identification information has been associated are not linked, linking the plurality of data items with which the identification information has been associated,
   wherein, in the executing, batch processing of the plurality of data items that have been linked by the linking is executed.

3. The data processing method according to claim 1, further comprising:
   storing, in a storage unit, the plurality of data items with which the identification information has been associated;
   acquiring, from the storage unit, data corresponding to identification information of data in which an error has occurred from among the plurality of data items, as a result of the batch processing performed by the executing; and
   re-executing the plurality of processes for the acquired data.

4. The data processing method according to claim 1, wherein the identification information is excluded from processing targets in the batch processing.

5. The data processing method according to claim 1, further comprising:
   generating, for each of the plurality of data items, a set of a header in which the identification information is set, and a payload in which the data is set,
   wherein, in the executing, batch processing is executed with the content of the payload as a processing target.

6. The data processing method according to claim 1, wherein the executing includes starting and stopping processing for each execution-target data item.

7. The data processing method according to claim 1, wherein
   the execution-target data is a file, and
   in the determining, the plurality of data items included in the file are determined,
   the data processing method further comprising:
      generating a plurality of headers that correspond to each of the plurality of data items and include the identification information;
      generating a plurality of payloads in which each of the plurality of data items serves as content; and
      generating a plurality of messages that correspond to each of the plurality of data items and include the headers and the payloads, and
   in the executing, the data included in the payloads of the messages is processed for each of the plurality of messages.

8. An information processing apparatus comprising:
   a memory; and
   a processor coupled to the memory and configured to:
      determine a plurality of data items included in execution-target data for which a same series of a plurality of processes is to be executed for the plurality of data items,
      associate identification information with respective data items among the plurality of data items,
      refer to definition information in which it is defined whether batch processing is possible for each of the plurality of processes,
      execute, based on the definition information for processes in which batch processing is possible from among the plurality of processes, batch processing of the plurality of data items with which the identification information has been associated;
      identify, based on the identification information, a processing result of at least one of the respective data items among the plurality of data items included in a result of the batch processing,
      determine, based on the definition information, processes in which batch processing is not possible from among the plurality of processes,
      when the plurality of data items with which the identification information has been associated are linked, for the processes in which the batch processing is not possible, separate the plurality of linked data items into separate data items, based on the identification information, and
      execute the processes in which the batch processing is not possible, for each of the separate data items.

9. The information processing apparatus according to claim 8, wherein the processor is configured to:
   when the plurality of data items with which the identification information has been associated are not linked, link the plurality of data items with which the identification information has been associated, and
   execute batch processing of the plurality of data items that have been linked.

10. The information processing apparatus according to claim 8, wherein the processor is configured to:
    store, in a storage unit, the plurality of data items with which the identification information has been associated,
    acquire, from the storage unit, data corresponding to identification information of data in which an error has occurred from among the plurality of data items, as a result of the batch processing performed, and
    re-executing the plurality of processes for the acquired data.

11. The information processing apparatus according to claim 8,
wherein the identification information is excluded from processing targets in the batch processing.

12. The information processing apparatus according to claim 8, wherein the processor is configured to:
generate, for each of the plurality of data items, a set of a header in which the identification information is set, and a payload in which the data is set, and
execute batch processing is executed with the content of the payload as a processing target.

13. The information processing apparatus according to claim 8, wherein the processor is configured to start and stop processing for each execution-target data item in the executing of the batch processing.

14. A non-transitory computer-readable recording medium storing a program for causing an information processing apparatus to execute a process, the process comprising:
determining a plurality of data items included in execution-target data for which a same series of a plurality of processes is to be executed for the plurality of data items;
associating identification information with respective data items among the plurality of data items;
referring to definition information in which it is defined whether batch processing is possible for each of the plurality of processes;
executing, based on the referring for processes in which batch processing is possible from among the plurality of processes, batch processing of the plurality of data items with which the identification information has been associated;
identifying, based on the identification information, a processing result of at least one of the respective data items among the plurality of data items included in a result of the batch processing;
determining, based on the referring, processes in which batch processing is not possible from among the plurality of processes;
when the plurality of data items with which the identification information has been associated are linked, for the processes in which the batch processing is not possible, separating the plurality of linked data items into separate data items, based on the identification information; and
executing the processes in which the batch processing is not possible, for each of the separate data items.

* * * * *